Oct. 22, 1968   R. S. GOODRICH   3,406,805
TABLE OR DESK MODEL TAPE EMBOSSER
Filed Oct. 3, 1966   5 Sheets-Sheet 1
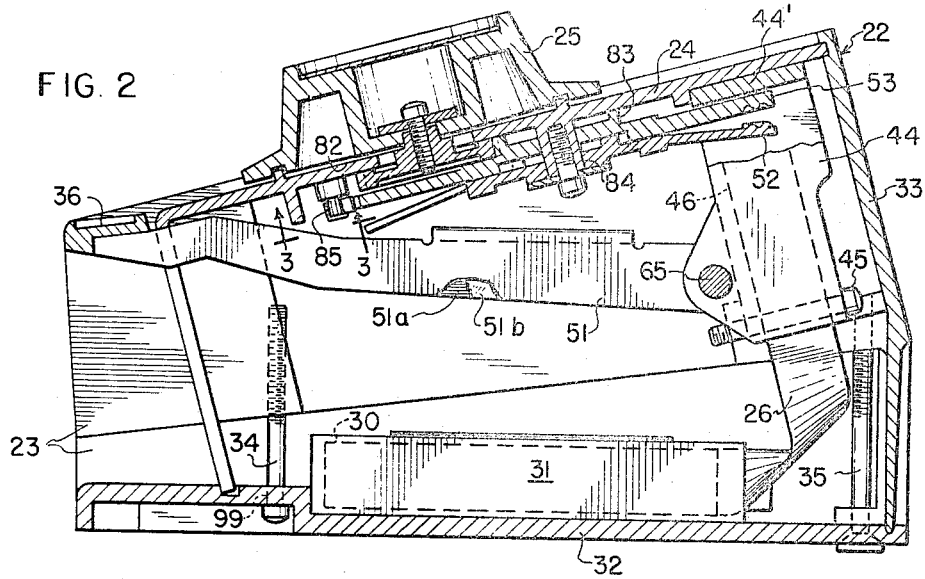
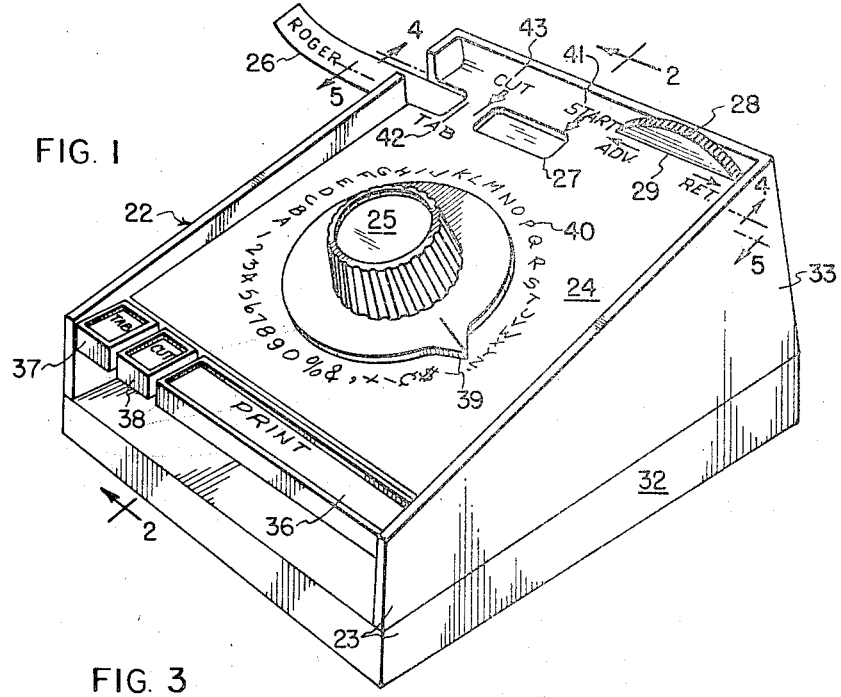
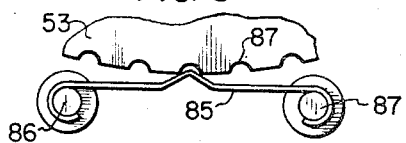
INVENTOR.
ROBERT S. GOODRICH
By Andrew N. Winterscorn
Atty.

Oct. 22, 1968     R. S. GOODRICH     3,406,805
TABLE OR DESK MODEL TAPE EMBOSSER
Filed Oct. 3, 1966     5 Sheets-Sheet 2

INVENTOR.
ROBERT S. GOODRICH
By Andrew J. Wintercorn
Atty.

Oct. 22, 1968   R. S. GOODRICH   3,406,805
TABLE OR DESK MODEL TAPE EMBOSSER
Filed Oct. 3, 1966   5 Sheets-Sheet 3

INVENTOR.
ROBERT S. GOODRICH
By Andrew P. Winterscorn
Atty.

Oct. 22, 1968 R. S. GOODRICH 3,406,805
TABLE OR DESK MODEL TAPE EMBOSSER
Filed Oct. 3, 1966 5 Sheets-Sheet 4

INVENTOR.
ROBERT S. GOODRICH
By Andrew N. Winterscorn
Atty.

Oct. 22, 1968   R. S. GOODRICH   3,406,805
TABLE OR DESK MODEL TAPE EMBOSSER
Filed Oct. 3, 1966   5 Sheets-Sheet 5

INVENTOR.
ROBERT S. GOODRICH
By Andrew N. Wintercorn
Atty.

United States Patent Office 3,406,805
Patented Oct. 22, 1968

3,406,805
TABLE OR DESK MODEL TAPE EMBOSSER
Robert S. Goodrich, Palos Verdes Peninsula, Calif., assignor to Apsco Products, Inc., Los Angeles, Calif., a corporation of California
Filed Oct. 3, 1966, Ser. No. 583,886
13 Claims. (Cl. 197—6.7)

ABSTRACT OF THE DISCLOSURE

This tape embosser has three keys, one marked "PRINT" is depressed to print the letter, numerals, or symbol, or may be depressed partway only to advance the tape, as in spacing, a second marked "CUT" being depressed to cut the tape, and the third marked "TAB" being depressed to cut only partway through the backing of the tape to keep two or more embossed strips connected for convenience in the handling, the individual labels being severed later, the embossed vinyl layer of each label being readily stripped from the backing to expose the adhesive when the label is to be applied to an article. A hand operable wheel rotatable in either direction parallel to the tape movement through the embosser serves for advancing or retracting the tape by appropriate rotation of one of two feed rollers that are normally disposed in nearly abutting relation and have the tape extending therebetween for feed purposes. The other feed roller has a starwheel and a ratchet wheel turning with it, a detent spring engaging the starwheel serving to hold the last named feed roller releasably in each position to which it is operated, while a pawl that is normally in retracted position realtive to the ratchet wheel is engageable with it and operable through a predetermined stroke to advance the tape one step of the starwheel, the pawl being operable for a one step advance by the "PRINT" key with only a partial stroke, not enough to do an embossing operation, or by a full stroke.

---

This invention relates to a new and improved table or desk model embosser, as distinguished from the conventional plier or squeeze action tape embossers, the present device being operable in a novel manner by merely pressing down on a "print" lever after turning a dial on the top of the device to select the particular letter, numeral or symbol to be embossed in the tape, whatever is selected being indicated by a pointer on the dial which sweeps across the top of the device where the letters, numerals and cymbols are displayed in a circle around the dial.

Important features of novelty in the present device are:
(1) A window is provided in the top of the case through which the operator can see the tape that is fed crosswise of the top, and thus check the progress of the embossing operation as one after another of the letters embossed appear, a web at one end of the window, marked "cut" at one point and "tab" at another point, indicating to the oeprator the proper position of the tape for cutting or tabbing after whatever has been embossed is to be tabbed or cut, tabbing being a partial cut keeping the strip still attached to the rest of the tape for severance later, whereas "cut" means severing the strip that has been embossed, from the rest of the tape.

(2) A tape advancing and retracting dial projects through a slot in the top of the case transversely thereof and parallel to and adjacent the window and can be turned by the operator in either direction to advance or retract the tape at a good rate of speed relative to the window in either direction, the "print" lever being also operable to advance the tape without embossing, by pressing it only half-way down, to give clear spaces on the tape without any embossed characters, this operation comparing somewhat to the depression of a spacing bar on a typewriter.

(3) A separate "cut" lever and a separate "tab" lever are operable on the front of the device alongside the "print" lever and arranged to be depressed in the same way, but oniy the "print" lever being operably connected with the tape advance mechanism so that the tape is automatically advanced one space per depression.

(4) The tape cartridges have radial openings in the top and bottom walls to permit visual checking on the amount of tape left on the roll inside, and a registering opening is provided in the bottom of the lower case section so that this checkup can be made from the bottom of the tape embosser without opening up the case.

The invention is illustrated in the accompanying drawings, in which:

FIG. 1 is a perspective view of a desk or table model tape embosser embodying my invention;

FIG. 2 is a vertical section through the device on the line 2—2 of FIG. 1;

FIG. 3 is a detail of the spring detent for releasably holding the imprinting wheel assembly in a selected position by engagement in circumferentially spaced notches provided in the periphery of the wheel;

The same reference numerals are applied to corresponding parts throughout the views.

Figure 5:
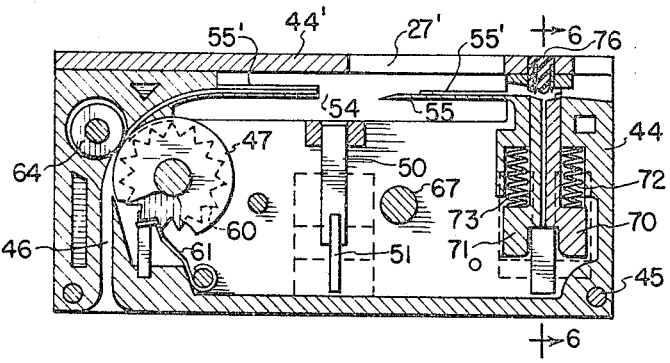
FIG. 5 is a cross-section on the same line, but looking in the opposite direction, as indicated by the arrows 5—5 in FIG. 1.

Referring first to FIGS. 1 to 3, for a general discussion of this invention, the tape embosser is designated generally by the reference numeral 22. It is a table or desk model tape embossing device utilizing tape including a plastic sheet adapted to crease while when embossed, and a backing sheet adhesively bonded thereto. Typical of such tapes suitable for this purpose and for use here is that disclosed in Souza Patent 3,036,945. The two-piece case 23, which is deeper at the back than at the front, provides an inclined top 24 which has a manually rotatable knob 25 in the center thereof for use in selecting the letters, numerals or symbols to be printed on the tape 26. The tape 26 is of the kind previously mentioned and is movable horizontally under a window 27 provided in the top 24 of the case at the front end, the wheel 28 that projects through a slot 29 provided transversely in the front portion of the top 24 being rotatable to the left or right to advance or retract the tape, which, as will presently appear, comes off a roll 30 in a cartridge 31 set in the lower case section 32. The main upper section 33 of the case 23 is demountably secured to the lower section 32 by screws 34 and 35, as seen in FIG. 2. The present device is operable in a novel manner. Thus, to imprint a letter, numeral, or symbol, the wide key 36 labeled "print" is depressed to the full extent. However, one may use this same key like the spacing bar on a typewriter, if the key is depressed only half-way and released, thereby advancing the tape without doing any embossing, as, for example, in spacing words. To make a part-way cut or "tab," the small left-hand "tab" key 37 is depressed all the way, whereby to keep the tape intact in one length for later selective severing of one after another of a series of labels and in such a way as to allow easy separation of the backing strip from the embossed vinyl layer on each label and thus expose the adhesive to permit application of the label to whatever surface may be intended. Thus, with "tab" cuts, a series of labels may be embossed at one time, and all of these labels, being interconnected in one strip, can be handled more easily than they could be if all were severed separately at the outset, as by depressing the "cut" key 38 all the way. In passing, it will be noticed that a radial pointer 39 is provided on the base of the knob 25, which indicates whatever letter, numeral or symbol is selected from those appearing in a circle around the base of the knob on the top 24, as at 40. The word "START" with its arrow pointing to the right-hand end of window 27 indicates to the operator where to look for the letters, symbols or numerals to appear at the commencement of an embossing operation. The word "TAB" at 42 with the indicator line above it, and the word "CUT" at 43 with the indicator line below it, serve to show the operator when the tape, after an embossing operation, has been advanced to one or the other of these points where the tab cut is to be made by depression of key 37, or the tape is to be cut off by depression of key 38. Positioning of the tape for one or the other of these operations is easily accomplished by turning the wheel 28 to the left or right to advance or retract the tape, as indicated by the arrows and legends below the slot 29.

Figure 4:
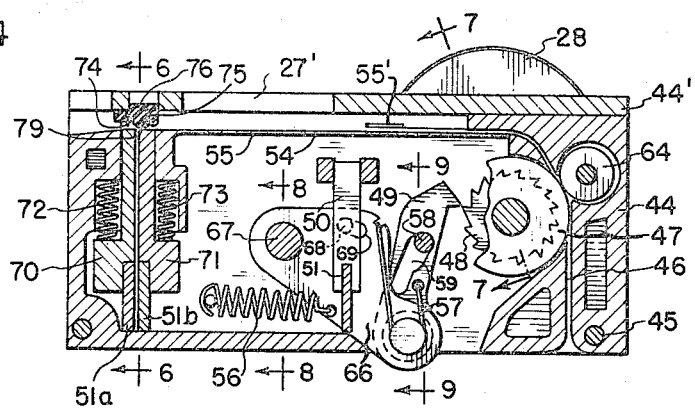
FIG. 4 is a cross-section on the line 4—4 of FIG. 1.

Referring now to FIGS. 4 and 5, and the related FIGS. 6 to 11, the front end assembly 44 has a window opening 27' in the top wall thereof which registers with the window opening 27 in the top 24 of the case when this assembly is secured in the proper section 33 of the case, as by screws 45 (FIG. 2). The tape 26, as illustrated in FIG. 2, is fed out of the cartridge 31 through a passage 46 over a feed roller 47, which has ratchet means 48 cooperating with a pawl 49 to advance the tape step by step automatically after each depression half-way or all the way of the "print" key 36. Punch 50 (FIG. 4) is operated by lever 51 (FIG. 2), one of three similar levers, when the print key 36 thereon is depressed, pressing the punch 50 upwardly against one flexible resilient spoke of the type wheel 52 to press it against its mating die in die wheel 53, the tape 26 being disposed therebetween, the punch 50 moving upwardly with the selected type through a hole 54 in the horizontal wall 55 in assembly 44 to perform this operation to the right of the window 27–27'. The die 53 is backed up in the embossing operation by the top plate 44' of the front end assembly 44. The tape 26 feeds horizontally over the wall 55 from passageway 46 from right to left under the window 27–27', as the parts appear in FIGS. 1 and 4, and the guides indicated at 55' on opposite sides of the assembly 44 over wall 55 are designed to guide a tape 26 of a given width. Spring 56 returns the key 36 with its lever 51 to its normal raised position when the key is released, the pawl 49 being operated in the return stroke by spring 57 through a predetermined stroke determined by pin 58 in slot 59 to cause the tape to be advanced always the same predetermined amount for each letter, numeral or symbol embossed, leaving the pawl 49 clear of ratchet 48, as seen in FIG. 4. A star wheel 60, turning with the feed roller 47 has a detent spring 61 cooperating therewith, as seen in FIG. 5, to hold the feed roller 47 releasably in each position of advance, so that all letters, numerals or symbols will, of course, be evenly spaced in the embossing operation. The wheel 28 is mounted for rotation in the frame of assembly 44, as at 28' in FIG. 7 and has an internal gear 62 provided thereon meshing with a gear 63 to enable advancing or retracting the tape by hand by turning the rubber faced smaller feed roller 64 normally disposed in nearly abutting relation to feed roller 47. Manual turning of wheel 28 in either direction is not interferred with by either the pawl 49 or the detent spring 61, but when the tape is advanced by depression of the key 36, feed roller 64 is turned by the tape and transmits drive to the wheel 28.

In passing, the reference numeral 65 designates the horizontal pivot pin extending transversely of the front end assembly 44 for pivotally mounting the three levers 51–51b operated by the keys 36, 37 and 39. The lever 51 for operating the punch 50, as was stated before, relies on spring 56 to return the "print" key 36 after each operation, and that is accomplished by having the oscillatable arm 66 that carries the pawl 49 and is pivoted at 67 in the assembly 44 operatively connected with the punch 50 by means of a radial pin 68 on the punch slidable in a slot 69 provided in the arm 66, as clearly illustrated in FIG. 4.

Figure 6:
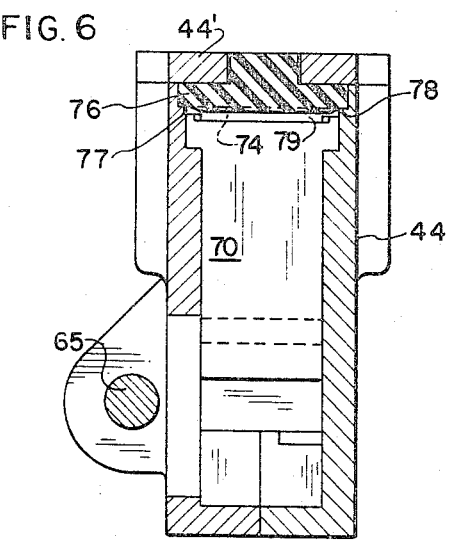
FIG. 6 is a sectional detail on the line 6—6 in FIGS. 4 and 5.
Figure 7:
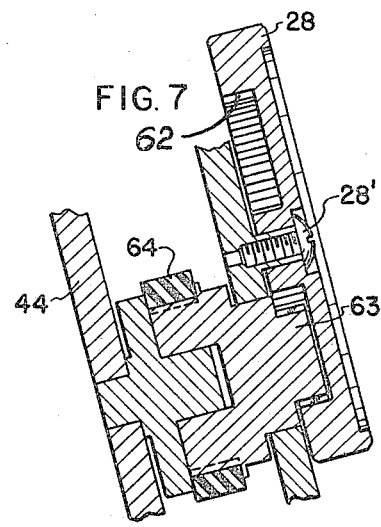
FIGS. 7, 8 and 9 are sectional details on the correspondingly numbered lines of FIG. 4.
Figure 8:
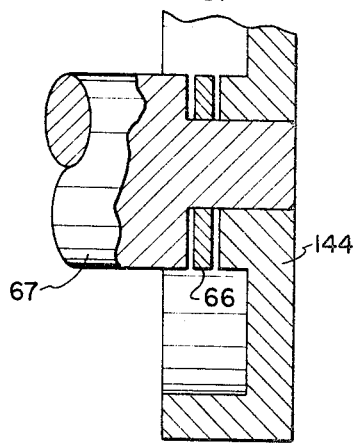
Figure 9:
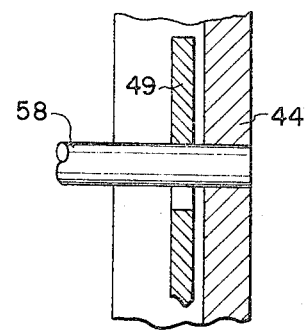
Figure 10:
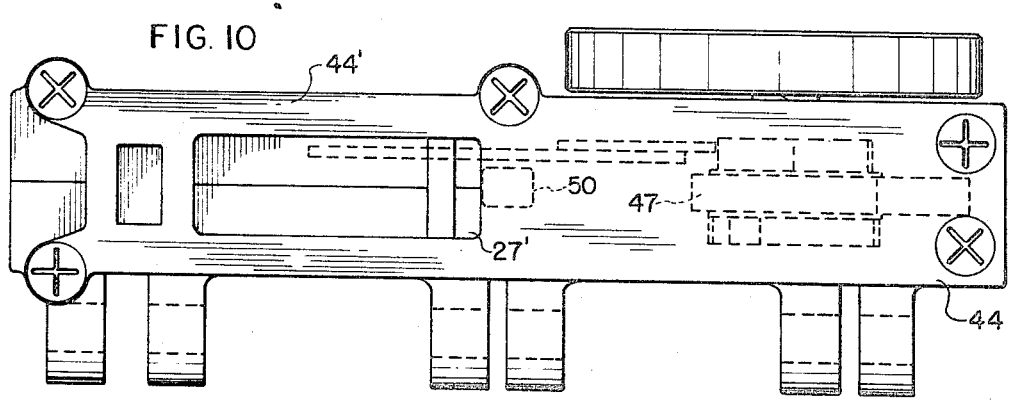
FIGS. 10 and 11 are a plan view and side view, respectively, of the front end assembly inside the tape embosser.
Figure 11:
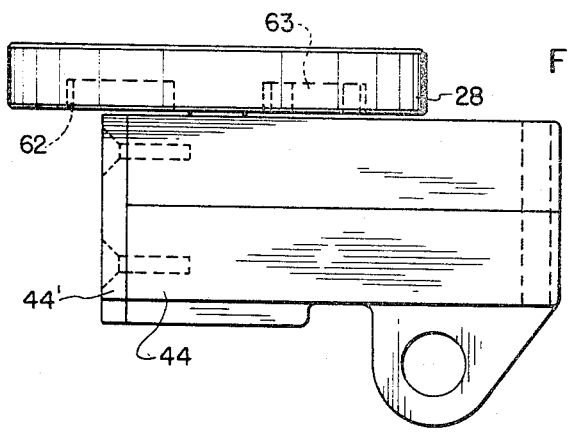
Figure 12:
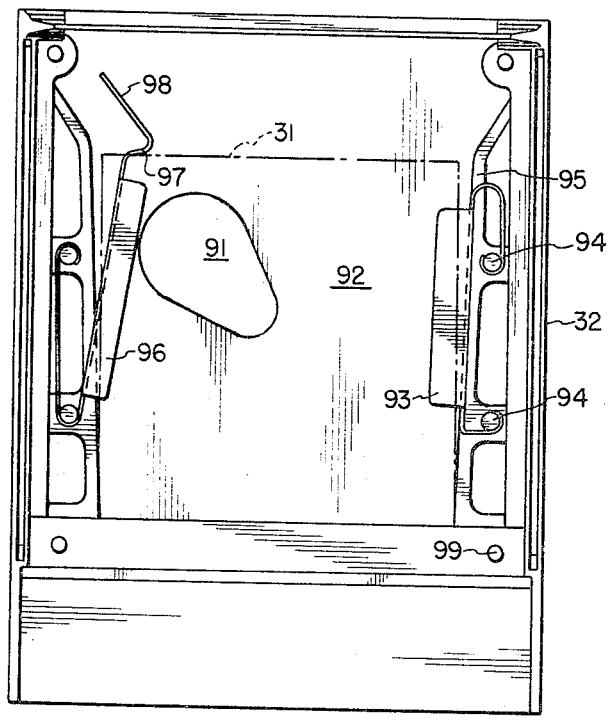
FIGS. 12 and 13 are a plan view and side view, respectively, of the lower case section of the tape embosser.
Figure 13:
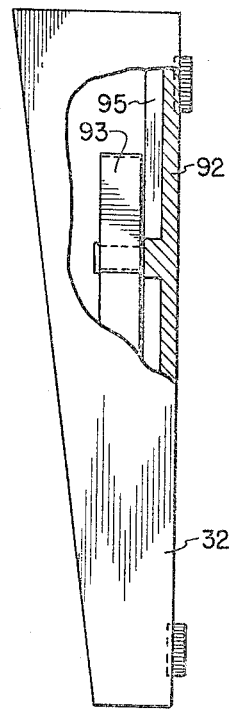
Figure 14:
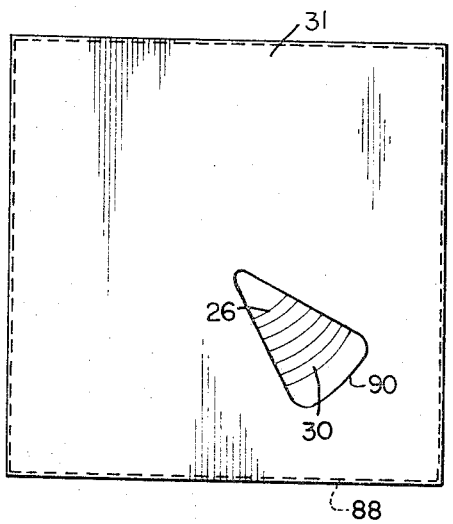
FIGS. 14 and 15 are two views of one of the tape cartridges for use in the lower case section.
Figure 15:
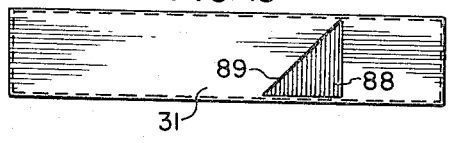
Figure 18:
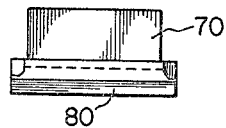
FIGS. 16, 17 and 18 are three views of the tab block.
Figure 16:
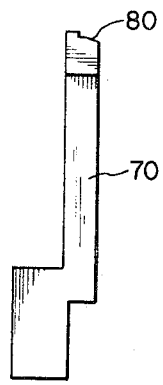
Figure 17:
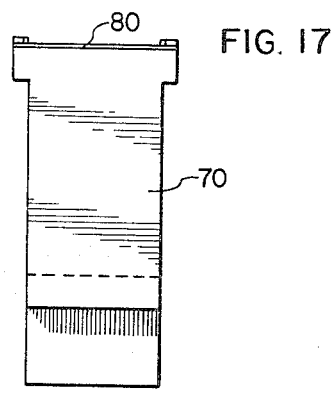
Figure 21:
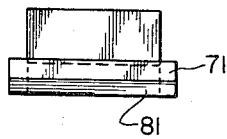
FIGS. 19, 20 and 21 are similar views of the cut block.
Figure 20:
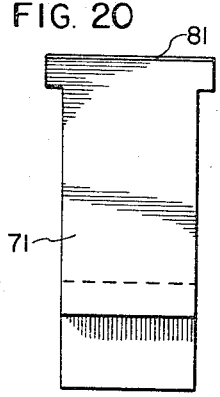
Figure 19:
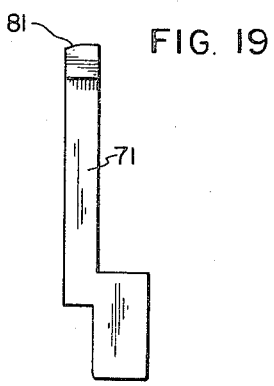

The other two levers 51a and 51b, that are similar to and mounted like lever 51 on cross-pin 65, are arranged, as seen at the left in FIG. 4, to cooperate at their front ends with the lower ends of the "tab" block 70 and the "cut" block 71, respectively, these levers being operable by the "tab" key 37 and "cut" key 38, respectively, against the action of return springs 72 and 73, respectively, compressible between the frame of assembly 44 and the blocks 70 and 71, as seen in FIGS. 4 and 5. When the "tab" key 37 is depressed, the tape 26 is cut through part way by means of blade 74. When the "cut" key 38 is depressed its full distance, the other blade 75 disposed in spaced parallel relation to blade 74, as seen in FIG. 4, cuts the tape all the way through. A wedge block 76 of rubber serves both to keep the blades 74 and 75 in the predetermined spaced relation and in the right planes relative to blocks 70 and 71, in addition to stripping the tape clear of both blades after they are used. The blades 74 and 75 are backed up by the top plate 44', and the same is true of the stripping wedge block 76 of rubber, as clearly appears in FIG. 6. Shoulders 77 and 78 are provided on the front and rear walls of the frame of assembly 44, as seen in FIG. 6, to locate the blades 74 and 75 against downward displacement, leaving ample tape clearance therebeneath and over the tops of the blocks 70 and 71, as seen at 79 in FIG. 4. The beveled upper end 80 on the tab block 70 cooperates with the blade 74 for the tab cut, and the oppositely bevelled upper end 81 on the cut block 71 cooperates with the balde 75 for the through cut. Blades 74 and 75 are alike, except that the lower front end portion of blade 74 is relieved for a small portion of the length of the blade just enough to cut only part-way across, leaving a label connected to the tape, whereas blade 75 cooperates with the bevelled face 81 on the "cut" block 71 its full length so as to cut all the way across and thus sever a label from the tape.

Knob 25, as seen in FIG. 2, has a gear 82 fixed to turn with it under the top 24, and this gear meshes with a gear 83 of the same diameter formed integral with the die-wheel 53. The type wheel 52 is suitably affixed to the die-wheel, and the two wheels are carried on a common axle 84 provided integral with and projecting downwardly from the top 24. Thus, a certain angularity of turning of knob 25 results in corresponding opposite turning of the wheels 52 and 53 together, and as is usual in tape embossing devices, the radial resilient or springable spokes of the type wheel 52 are adapted to be flexed upwardly toward the die-wheel 53 enough to do the embossing operation on the tape 26 disposed therebetween on wall 55. An elongated detent spring 85 mounted on spaced posts 86 provided on the bottom of the top 24 serves by engagement of its V-projection selectively in circumferentially spaced notches 87 provided in the periphery of the die-wheel 53 to hold the parts in a set position and maintain the setting until the selector knob 25 is turned to a new setting.

In conclusion, attention is called to FIGS. 12 to 15, showing the square tape cartridge 31 for a roll 30 of the tape 26 as having a triangular-shaped opening 88 in the vertical front wall, the diagonal side 89 of which serves as a guide for the tape 26 as it comes out of the cartridge and makes a right angle turn upwardly to enter the guide passage-way 46 in the assembly 44. There are two other triangular-shaped openings 90 provided in registering relation in the top and bottom walls of the cartridge in radial relationship to the center of the cartridge and accordingly to the center of the roll 30 of tape therein, so one can tell easily from looking at the cartridge how much tape is left at the time the cartridge is placed in the lower case section 32, and also if the user is careful to place the cartridge 31 in the lower case section 32 with one of these openings 90 in register with a larger triangular-shaped opening 91 provided in the bottom wall 92 of the lower case section, he can easily tell by looking at the bottom of the tape embosser how much tape is left, thus eliminating any guesswork and warning the user when it is advisable to get another cartridge, so as not to have the device not usable for lack of tape. The cartridge 31 fits between a right-hand clip spring 93 stationarily mounted on posts 94 in the lower case section 32 on one side of a generally rectangular depression 95 provided in the bottom of the lower case section, and another left-hand clip spring 96 disposed on the opposite side of the depression 95 and springable inwardly relative thereto and having an inwardly bent free end portion 97 with a handle 98 for its manipulation for releasably locking the cartridge 31 in place, with the flanges on these clips holding the cartridge down. Four screws 34–35 entered through holes 99 in the four corners oft he lower case section serve to fasten it to the main upper section 33, so it is an easy matter to remove and replace the lower case section whenever tape 26 is used up and the tape cartridge 31 has to be replaced.

The operation of the device having been described in the opening paragraph of the description as a general description of the device, there is no need for adding much more. The front end assembly 44 has the die-wheel 53 projecting into it over the top wall 55 and in closely spaced relation to the top plate 44', so that the tape moveable across the top wall 55, between it and the die-wheel 53, will be embossed by the type of whichever one of the spokes of the type wheel 53 happens to be aligned with the punch 50 when it is deflected upwardly by the punch, this operation being through the hole 54 in the top wall 55. The extent of projection of the die-wheel 53 and type wheel 52 into the assembly 44 is plainly indicated in FIG. 2. Due to the length of levers 51, 51a and 51b and the fact that they are pivoted at 65, so close to their front ends, it is obvious that I obtain sufficient leverage to make the embossing operation with key 36 as easy by finger pressure as it is by squeeze action of the whole hand in the old conventional tape embossers. The same is true of the cutting operation with key 38 and the tab operation with key 37. The tape 26 has a plastic top layer of one color which embosses white that is cut all the way through in a "tab" cut but the plastic backing which is usually of a different color is cut only partway across, so the backing must be torn the rest of the way across when the label is being removed from the strip, and, in that operation, there is enough of a separation of the backing from the embossed plastic part to make it easier to take hold of the backing at one end and strip it off.

It is believed the foregoing description conveys a good understanding of the objects and advantages of my invention. The appended claims have been drawn to cover all legitimate modifications and adaptations.

I claim:

1. A device for embossing characters on an elongated tape comprising a generally rectangular case having a tape viewing window and tape guide means therebelow, both extending transversely of one end portion of said case, a manually rotatable wheel disposed in a substantially vertical plane parallel to said tape guide means for operating drive means for advancing and retracting an embossable tape in said guide means independently of step by step tape feed means, manually rotatable type and die means positionable to receive and emboss said tape at an embossing position alongside one end of said tape viewing window, tape cut-off means providing a tape cut-off position alongside the other end of said tape viewing window, key means manually repressable relative to the other end of said case remote from the first mentioned end operating force multiplying levers pivotally mounted intermediate their ends in said case near the first mentioned end thereof for selectively operating said tape cut-off means and said type and die means, respectively, each being operable by a key independently of the other, spring means returning said levers to a retracted position, and step by step tape feed means operable by the lever that operates said type and die means so as to advance the tape step by step upon each return movement of said lever, said step by step tape feed means being operable to advance the tape without the tape embossing operation of said type and die means by depression of the key only part way whereas full depression of the key is required for tape embossing.

2. A device as set forth in claim 1, wherein the tape has a backing strip covering a pressure adhesive coating on the back of the tape, the device including another tape cutting means operable by a key means independently of and disposed alongside the tape cut-off means adapted for cutting through the embossed part of the tape but only partway across the backing, whereby to leave the embossed labels connected so as to be easily torn apart and in tearing a label off by tearing the backing the rest of the way, the end of the backing will be separated from the embossed part enough to enable easily taking hold of it to strip it off.

3. A device as set forth in claim 1, wherein the manually rotatable type and die means is disposed substantially horizontally for rotation on a substantially vertical axis relative to and under the top wall of said case, with the die means turning relative to and over the tape guide means under a top wall on the case, the type means being in the form of upwardly flexible resilient radial spokes disposed under and flexible upwardly through an opening provided therefor in said tape guide means, whereby to emboss the tape movable on the tape guide means between the die means and type means, there being a manually rotatable knob for turning said type and die means disposed above the top of said case having a radial pointer movable over a circle of characters provided on the top of said case corresponding to the characters in said type and die means to indicate the character selected for embossing on the tape at each setting of the knob.

4. A device as set forth in claim 1, wherein the tape feed means operable by the manually operable wheel operates selectively in either direction one of two feed rollers having their peripheries disposed in closely spaced nearly abutting relation, one of said rollers having its periphery defined by compressible resilient material, whereby the tape is gripped resiliently when extending between these rollers, the other roller being operable step by step only in a forward direction by tape feed means operable with the type and die means in each embossing operation.

5. A device as set forth in claim 1 including a removable and replaceable substantially horizontal tape cartridge housed and retained in the lower portion of said case and containing a substantially horizontal roll of tape, the tape extending off the roll through a substantially triangular opening provided in a substantially vertical side wall of the cartridge which includes a guiding edge extending at an angle of approximately 45° relative to a vertical on which the tape is slidably guided in making a substantially right angle turn in leaving the cartridge, the case including a passageway for guiding the tape upwardly from the guiding edge in the cartridge to one end of said tape guide means extending transversely of one end portion of said case.

6. A device as set forth in claim 1, wherein the tape cut-off means comprises an elongated blade disposed transversely of said tape guide means substantially horizontally in a substantially vertical plane and in a fixed vertically spaced relation to the tape guide means and having a bottom cutting edge, and a block reciprocable below said blade substantially vertically relative to said case and tape guide means operable upwardly against the blade's cutting edge against spring pressure active on said block.

7. A device as set forth in claim 6 including a compressible rubber body mounted with the blade and normally projecting below the bottom cutting edge of the blade, the rubber being compressed upwardly in the tape cutting operation and serving thereafter to press downwardly on the tape to strip it off said blade.

8. A device as set forth in claim 1 including another tape cutting means operable by a key means independently of and disposed alongside the tape cut-off means for only partially cutting through the tape, and another key means alongside the other key means manually depressable relative to said case for operating another force multiplying lever pivotally mounted intermediate the ends thereof in said case near its first mentioned end and operatively connected with said other tape cutting means.

9. A device as set forth in claim 8, wherein the other tape cutting means comprises an elongated blade disposed transversely of said tape guide means substantially horizontally in a substantially vertical plane and in a fixed vertically spaced relation to the tape guide means and having a bottom cutting edge, and a block reciprocable below said blade substantially vertically relative to said case and tape guide means operable upwardly against the blade's cutting edge against spring pressure active on said block.

10. A device as set forth in claim 9 including a compressible rubber body mounted with the blade and normally projecting below the bottom cutting edge of the blade, the rubber being compressed upwardly in the tape cutting operation and serving thereafter to press downwardly on the tape to strip it off said blade.

11. A device as set forth in claim 1, wherein the tape has a backing strip covering a pressure adhesive coating on the back of the tape, the device including another tape cutting means operable by a key means independently of and disposed alongside the tape cut-off means adapted for cutting through the embossed part of the tape but only partway across the backing, whereby to leave the embossed labels connected so as to be easily torn apart and in tearing a label off by tearing the backing the rest of the way the end of the backing will be separated from the embossed part enough to enable easily taking hold of it to strip it off, the device including another key means alongside the other key means manually depressable relative to said case for operating another force multiplying lever pivotally mounted intermediate the ends thereof in said case near its first mentioned end and operatively connected with said other tape cutting means.

12. A device as set forth in claim 11, wherein the other tape cutting means comprises an elongated blade disposed transversely of said tape guide means substantially horizontally in a substantially vertical plane and in a fixed vertically spaced relation to the tape guide means and having a bottom cutting edge, and a block reciprocable below said blade substantially vertically relative to said case and tape guide means operable upwardly against the blade's cutting edge against spring pressure active on said block.

13. A device as set forth in claim 12 including a compressible rubber body mounted with the blade and normally projecting below the bottom cutting edge of the blade, the rubber being compressed upwardly in the tape cutting operation and serving thereafter to press downwardly on the tape to strip it off said blade.

References Cited

UNITED STATES PATENTS

| | | | |
|---|---|---|---|
| 3,091,318 | 5/1963 | Carboni | 197—6.7 |
| 3,155,215 | 11/1964 | Avery | 197—6.7 |
| 3,255,860 | 6/1966 | Bremer | 197—6.7 |
| 3,272,301 | 9/1966 | Craig | 197—6.7 |
| 3,280,954 | 10/1966 | Bremer et al. | 197—6.7 |
| 3,280,955 | 10/1966 | Brown | 197—6.7 |
| 3,288,259 | 11/1966 | Bremer | 197—6.7 |
| 3,307,674 | 3/1967 | Massen et al. | 197—6.7 |
| 3,310,145 | 3/1967 | Pederson | 197—6.7 |

ROBERT E. PULFREY, Primary Examiner.

E. S. BURR, Assistant Examiner.